United States Patent
Pania et al.

(10) Patent No.: US 12,470,637 B2
(45) Date of Patent: Nov. 11, 2025

(54) METHOD AND SYSTEM FOR DELIVERING PUSH NOTIFICATIONS USING A SOFTWARE DEVELOPMENT KIT

(71) Applicant: WizRocket Inc., Mountain View, CA (US)

(72) Inventors: Darshan Pania, Mumbai (IN); Divyekant Gupta, Mumbai (IN); Piyush Kukadiya, Mumbai (IN); Harsh Shah, Mumbai (IN)

(73) Assignee: WizRocket Inc., Mountain View, CA (US)

( * ) Notice: Subject to any disclaimer, the term of this patent is extended or adjusted under 35 U.S.C. 154(b) by 108 days.

(21) Appl. No.: 18/298,147

(22) Filed: Apr. 10, 2023

(65) Prior Publication Data

US 2024/0340355 A1    Oct. 10, 2024

(51) Int. Cl.
*H04L 67/55* (2022.01)
*H04L 51/224* (2022.01)

(52) U.S. Cl.
CPC ............ *H04L 67/55* (2022.05); *H04L 51/224* (2022.05)

(58) Field of Classification Search
CPC .............................. H04L 67/55; H04L 51/224
USPC .......................................................... 709/207
See application file for complete search history.

(56) References Cited

U.S. PATENT DOCUMENTS

| | | | | |
|---|---|---|---|---|
| 11,711,332 B2* | 7/2023 | Kim | ........................ | G01S 13/46 709/207 |
| 2013/0132573 A1* | 5/2013 | Lindblom | ............. | H04L 51/224 709/225 |
| 2015/0207893 A1* | 7/2015 | Lee | ...................... | H04L 12/1859 709/206 |
| 2015/0381536 A1* | 12/2015 | Ptitsyn | .................... | H04L 67/06 709/206 |
| 2019/0318325 A1* | 10/2019 | Kadiwala | ............. | G06Q 20/209 |
| 2020/0034088 A1* | 1/2020 | Yano | ...................... | G06F 3/1288 |
| 2021/0067598 A1* | 3/2021 | Bhat | ........................ | H04L 67/63 |
| 2022/0174566 A1* | 6/2022 | Shreevastav | .......... | H04W 24/02 |
| 2023/0185957 A1* | 6/2023 | Brown | .................... | H04L 51/42 726/26 |
| 2023/0247025 A1* | 8/2023 | Nakayama | ............ | H04L 63/102 726/4 |
| 2023/0269268 A1* | 8/2023 | Stanley | ................... | H04L 67/55 709/206 |

(Continued)

*Primary Examiner* — Tauqir Hussain
(74) *Attorney, Agent, or Firm* — Kolisch Hartwell, P.C.

(57) ABSTRACT

The present disclosure provides a method and system to render the push notifications in a communication device of a user. The present disclosure includes a software development kit. The SDK works even when the battery optimization in the communication are turned on. The present disclosure has dedicated server allocations. Servers use firebase cloud messaging APIs to send a notification to the communication device. The FCM servers send the notification downstream to the one or more communication device's operating system to broadcast an intent. This intent is listened by the firebase cloud messaging software development kit installed in a memory of the communication device. The SDK passes the notification payload to a notification service of an application and the notification is rendered. Further, the present disclosure prevents ANR errors and may enable the FCM service in devices that may have not supported FCM service previously.

9 Claims, 3 Drawing Sheets

(56) References Cited

U.S. PATENT DOCUMENTS

| | | | |
|---|---|---|---|
| 2023/0274831 A1* | 8/2023 | Arai | G16H 50/80 |
| | | | 700/90 |
| 2023/0276470 A1* | 8/2023 | Di Girolamo | H04W 4/06 |
| | | | 370/312 |

* cited by examiner

METHOD AND SYSTEM FOR DELIVERING PUSH NOTIFICATIONS USING A SOFTWARE DEVELOPMENT KIT

TECHNICAL FIELD

The present disclosure relates to the field of computer systems/mobile systems, and in particular, relates to a method and system for dynamic rendering of push notifications.

INTRODUCTION

At present, push technology is a type of Internet-based communication where the request for a given transaction is initiated by a "publisher" or server. Push services are sometimes based upon information preferences expressed in advance. This is referred to as a "publish/subscribe" model. In an example, a client might subscribe to one or more information "channels." The server associated with the channels can then push information to the client when new content becomes available. Push notifications are an integral part of mobile applications. It is also being used as an asynchronous way of notifying users on the web (browsers) as well. These notifications provide a vital business value of keeping users engaged with their particular application (or website) even when they do not have it actively. Each mobile platform handles push notifications in its own way. Push notifications are meant to be asynchronous in nature. Applications using push notifications typically use a fire-and-forget method of sending their notification requests and the list of all registered devices to the end services.

However, current push services may be hindered by battery optimization in user's communication device. Therefore, a system is desired to solve the aforementioned drawbacks of the current technological model.

SUMMARY

In a first example, a computer-implemented method is provided. The computer-implemented method enables rendering of push notifications in a communication device. The computer-implemented method includes a first step of receiving, at a firebase cloud messaging server, a set of data related to a push notification to be rendered in the communication device of a user of a plurality of users. In addition, the computer-implemented method includes a second step of delivering, to a mobile operating system, the set of data from the firebase cloud messaging server. Moreover, the computer-implemented method includes a third step of listening, at a broadcast receiver, an intent of a cloud to device messaging service. Further, the computer-implemented method includes a fourth step of rendering, at the communication device, the push notification. The mobile operating system is installed in the communication device of the user of the plurality of users. The intent refers to C2DM intent that is an explicit broadcast from Android OS containing push notification data. The push notification is a relevant set of data provided to the user of the plurality of users.

In an embodiment of the present disclosure, the set of data includes a notification message and a data message.

In an embodiment of the present disclosure, the broadcast receiver instantly decodes the set of data and renders the notification in the communication device of the user of the plurality of users.

In an embodiment of the present disclosure, the notification message is rendered in the communication device of the user of the plurality of users and the rendering of the notification message is not prohibited by any battery optimization in the communication device.

In an embodiment of the present disclosure, a SDK associated with the broadcas5 receiver prevents the mobile operating system from ANR errors.

In a second example, a computer system is provided. The computer system includes one or more processors and a memory. The memory is coupled to the one or more processors. The instructions cause the one or more processors to perform a method for rendering of push notifications in a communication device. The method includes a first step of receiving, at a firebase cloud messaging server, a set of data related to a push notification to be rendered in the communication device of a user of a plurality of users. In addition, the method includes a second step of delivering, to a mobile operating system, the set of data from the firebase cloud messaging server. Moreover, the method includes a third step of listening, at a broadcast receiver, an intent of a cloud to device messaging service. Further, the method includes a fourth step of rendering, at the communication device, the push notification. The mobile operating system is installed in the communication device of the user of the plurality of users. The intent refers to C2DM intent that is an explicit broadcast from Android OS containing push notification data. The push notification is a relevant set of data provided to the user of the plurality of users.

In a third example, a non-transitory computer-readable storage medium is provided. The non-transitory computer-readable storage medium encodes computer executable instructions that, when executed by at least one processor, performs a method for rendering of push notifications in a communication device. The method includes a first step of receiving, at a firebase cloud messaging server, a set of data related to a push notification to be rendered in the communication device of a user of a plurality of users. In addition, the method includes a second step of delivering, to a mobile operating system, the set of data from the firebase cloud messaging server. Moreover, the method includes a third step of listening, at a broadcast receiver, an intent of a cloud to device messaging service. Further, the method includes a fourth step of rendering, at the communication device, the push notification. The mobile operating system is installed in the communication device of the user of the plurality of users. The intent refers to C2DM intent that is an explicit broadcast from Android OS containing push notification data. The push notification is a relevant set of data provided to the user of the plurality of users.

BRIEF DESCRIPTION OF THE DRAWINGS

Figure 1:
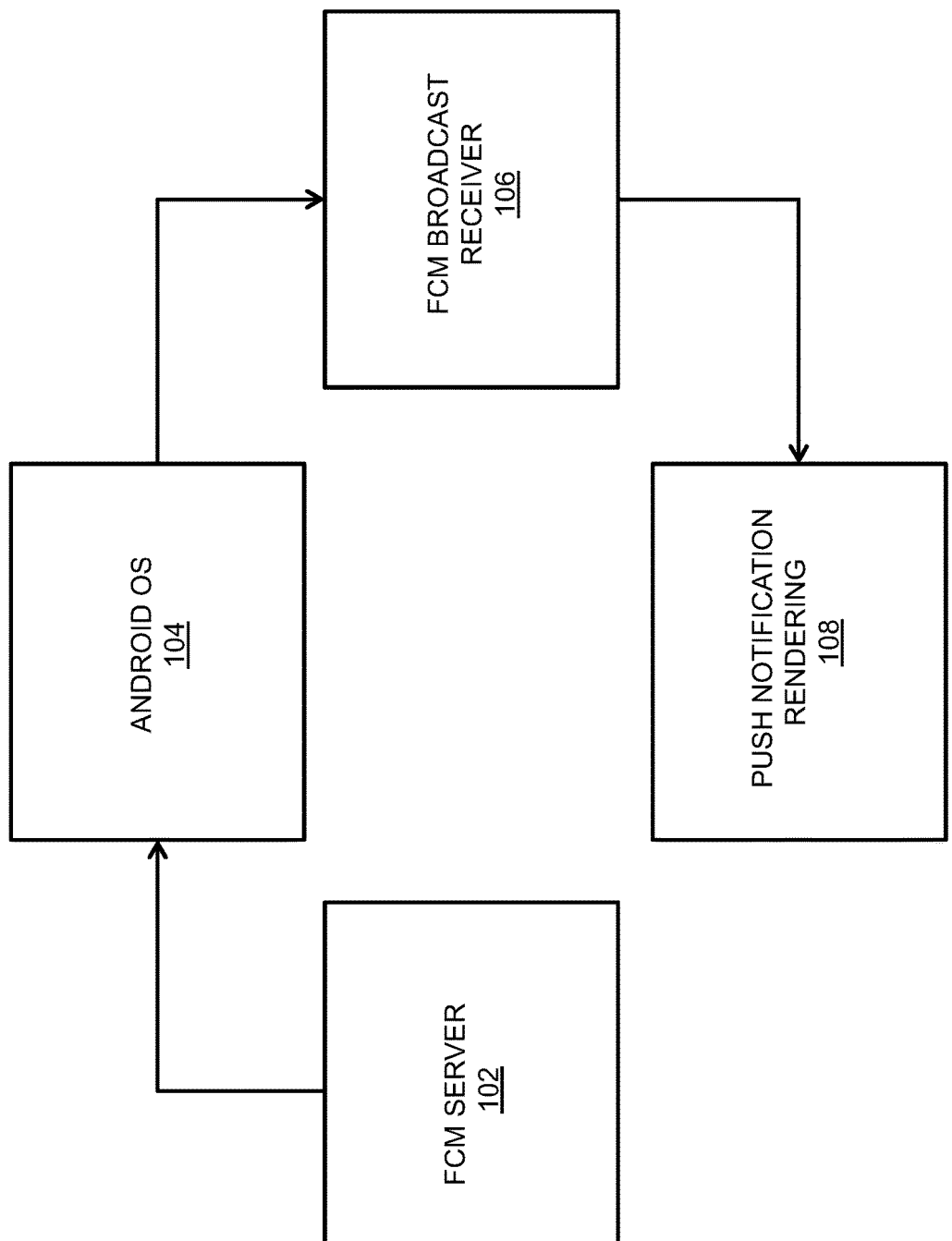
Figure 2:
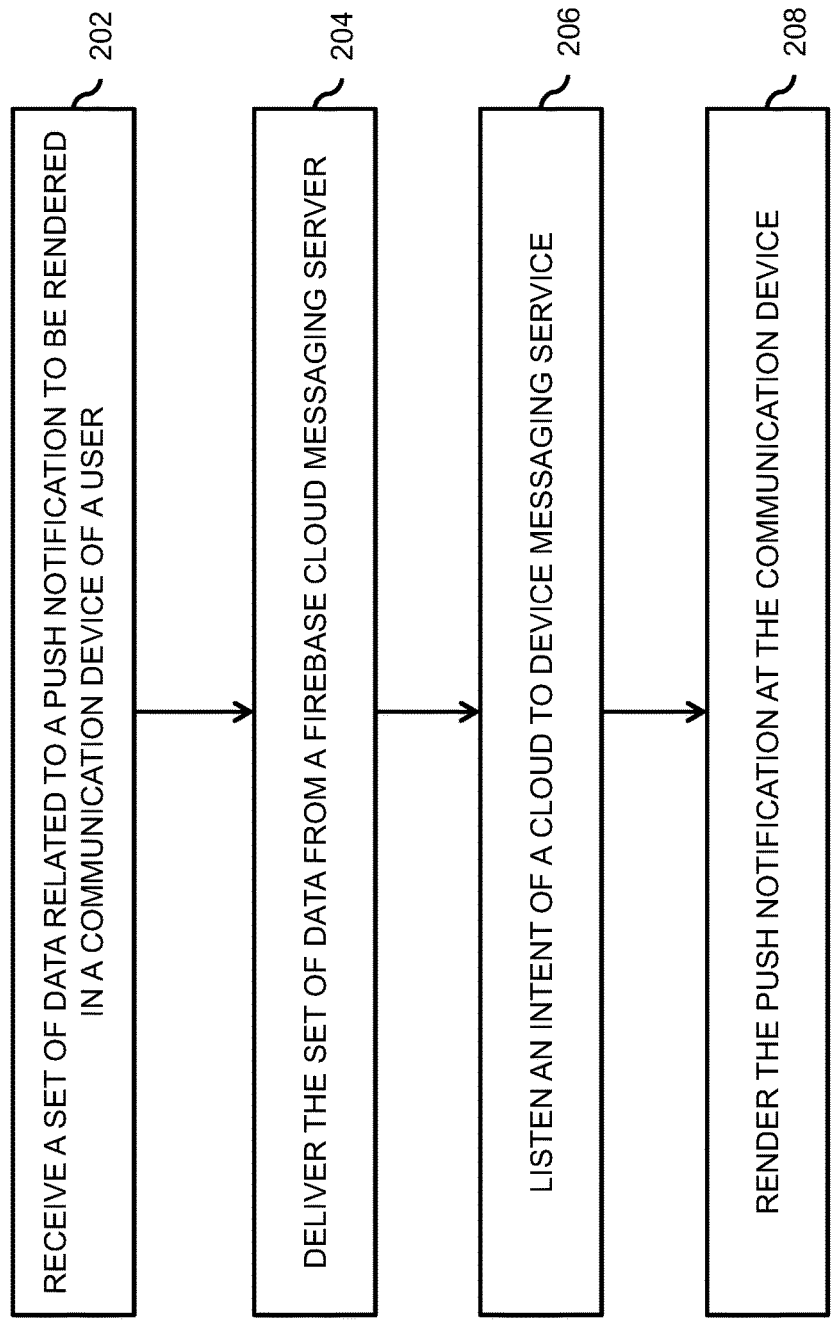
Figure 3:
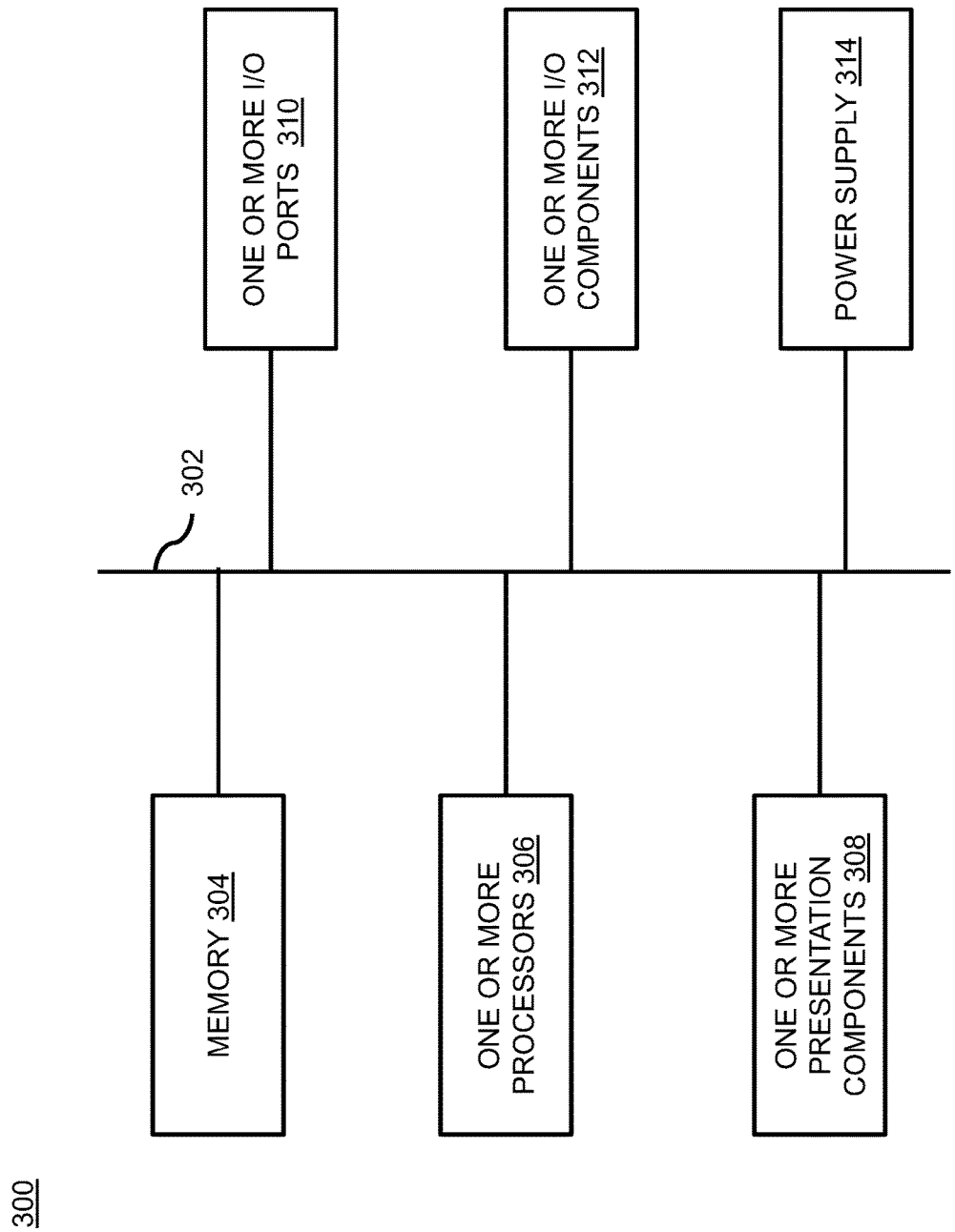

Having thus described the invention in general terms, references will now be made to the accompanying figures, wherein:

FIG. 1 illustrates a block diagram depicting a method used to deliver push notifications in a communication device according to prior art;

FIG. 2 illustrates a flow chart diagram depicting a method used to render push notifications in a communication device, in accordance with various embodiments of the present disclosure; and FIG. 3 illustrates a block diagram depicting a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

The present disclosure provides a method and system to render the push notifications in a communication device of a user. The present disclosure includes a software development kit. The SDK works even when the battery optimization in the communication are turned on. The present disclosure has dedicated server allocations. Servers use firebase cloud messaging APIs to send a notification to the one or more communication device of the user. The FCM servers send the notification downstream to the one or more communication device's operating system to broadcast an intent. This intent is listened to by the firebase cloud messaging software development kit installed in the memory of the one or more communication device. The software then passes the notification payload to the notification service of the application and then the notification is rendered. Further, the present disclosure prevents ANR errors and may enable the FCM service in devices that may have not supported FCM service previously.

FIG. 1 illustrates a block diagram 100 depicting a system to render push notifications as per the prior arts. FIG. 1 includes a firebase cloud messaging (FCM here on after) server 102, an Android operating system block 104, a FCM broadcast receiver 106 and at the block 108, push notifications are rendered at a communication device of a plurality of users. The aforementioned does not account for any battery optimization present, in active state, in the communication device of the plurality of users. Hence, the notification may get delivered but may not be rendered on the screen of the communication device of the plurality of users. The aforementioned method includes receiving data at the FCM broadcast receiver 106 through FCM server 102 and android OS 104. The FCM broadcast receiver then may render the notification at the communication device of the plurality of the users. The data may include a data message and a notification message. The data may be relevant to the plurality of users.

FIG. 2 illustrates a flowchart 200 depicting a method to render push notifications using a software development kit (SDK here on after), in accordance with various embodiments of the present disclosure. The method enables rendering of push notifications in a communication device. The method to render push notifications using the software development kit is performed by a push notification system.

At step 202, the push notification system receives a set of data related to a push notification to be rendered in the communication device of a user of a plurality of users. The set of data is received at a firebase cloud messaging server (hereinafter "FCM server"). In an embodiment of the present disclosure, the set of data includes a notification message and a data message. The FCM server pushes the notification message towards the communication device of the user. The user may be any client, person, business or organization that uses the communication device.

In an embodiment of the present disclosure, the communication device is associated with the user. The communication device is any device which mainly comprises a random access memory, a non-volatile storage system, and a display panel. In an embodiment of the present disclosure, the communication device is a portable communication device. In an example, the portable communication device includes laptop, smartphone, tablet, smart watch and the like. In an example, the smartphone is at least one of an Apple smartphone, an Android-based smartphone, a Windows-based smartphone and the like. In another embodiment of the present disclosure, the communication device is a fixed communication device. In an example, the fixed communication device includes a desktop, a workstation PC and the like.

In addition, the communication device requires an operating system. The operating system is system software that manages hardware and software resources and provides common services for computer programs. In an embodiment of the present disclosure, the operating system installed in the communication device is a mobile operating system. In another embodiment of the present disclosure, the communication device runs on any suitable operating system designed for the portable computer system. In an example, the mobile operating system includes but may not be limited to Windows operating system from Microsoft, Android operating system from Google, iOS operating system from Apple, Symbian based operating system from Nokia. In an embodiment of the present disclosure, the operating system is not limited to the above mentioned operating systems. In addition, the communication device runs on any version of the above mentioned operating systems.

In another embodiment of the present disclosure, the communication device runs on any suitable operating system designed for fixed computer system. In an example, the operating system installed in the communication device is Windows from Microsoft. In another example, the operating system installed in the communication device is Mac from Apple. In yet another example, the operating system installed in the communication device is Linux based operating system. In yet another example, the operating system installed in the communication device may be UNIX, Kali Linux, and the like.

In an embodiment of the present disclosure, the communication device runs on any version of Windows operating system. In another embodiment of the present disclosure, the communication device runs on any version of Mac operating system. In another embodiment of the present disclosure, the communication device runs on any version of Linux operating system. In yet another embodiment of the present disclosure, the communication device runs on any version of the above mentioned operating systems.

In an embodiment of the present disclosure, the communication device includes a display panel. Also, the communication device includes the display panel to display the push notifications. In an embodiment of the present disclosure, the communication device includes an advanced vision display panel. The advanced vision display panels include OLED, AMOLED, Super AMOLED, Retina display, Haptic touchscreen display and the like. In another embodiment of the present disclosure, the communication device includes a basic display panel. The basic display panel includes but may not be limited to LCD, IPS-LCD, capacitive touchscreen LCD, resistive touchscreen LCD, TFT-LCD and the like.

The push notification system is associated with a server. The server is a computer program or device that provides functionality to other programs or devices. The server provides various functionalities, such as sharing data or resources among multiple clients, or performing computation for a client or the user.

At step 204, the push notification system delivers, to a mobile operating system of the communication device, the set of data from the firebase cloud messaging server (FCM server). The mobile operating system is installed in the communication device of the user of the plurality of users. The mobile operating system present in the communication device of the user of the plurality of users receives the notification message.

Further, at step 206, the push notification system listens to an intent of a cloud to device messaging service (C2DM). The intent is listened at a broadcast receiver associated with the push notification system. C2DM broadcast is an explicit system intent that is broadcast to the communication device. The intent refers to C2DM intent that is an explicit broadcast from Android OS containing push notification data.

Moreover, at step 208, the push notification system renders the push notification at the communication device. The push notification is a relevant set of data provided to the user of the plurality of users. In an embodiment of the present disclosure, the broadcast receiver listens to the C2DM intent and renders the notification data in the communication device of the user of the plurality of users. In an embodiment of the present disclosure, the broadcast receiver instantly decodes the set of data and renders the notification in the communication device of the user of the plurality of users.

In an embodiment of the present disclosure, the notification message is rendered in the communication device of the user of the plurality of the users and the rendering of the notification message is not prohibited by any battery optimization in the communication device.

In an embodiment of the present disclosure, a SDK associated with the broadcast receiver prevents the mobile operating system from ANR errors.

The present subject matter allows the notification delivery system to run for a defined time of 4.5 seconds to avoid any "application not responding (ANR)" errors. In general, when the user interface thread of an Android application is blocked for too long, an "Application Not Responding" (ANR) error is triggered. If the app is in the foreground, the system displays a dialog to the user. The ANR dialog gives the user the opportunity to force quit the app. Application not responding errors usually occur if the UI thread is blocked for more than 5 seconds. Hence, the SDK has a timeout of 4.5 seconds which is fixed. The present subject matter also has a provision for push render de-duplication (in case both FCM and receiver try to render the notification) is managed by the CleverTap Core Android SDK.

The SDK runs for 4.5 s whenever a Push Notification payload reaches the device. The SDK manages to disable the OEM*battery optimizations to sometimes allow the running of the FCM Service which primarily tries to render the push notification. Because of this, the SDK enables FCM to render push notifications on devices that previously could not run the FCM Service and thereby could not render push notifications.

FIG. 3 illustrates the block diagram of a computing device 300, in accordance with various embodiments of the present disclosure. The computing device 300 depicts internal components of the communication device. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for rendering push notifications in a communication device, the computer-implemented method comprising:
   receiving, at a firebase cloud messaging server, a set of data related to a push notification to be rendered in the communication device of a user of a plurality of users;
   delivering, to a mobile operating system, the set of data from the firebase cloud messaging server, wherein the mobile operating system is installed in the communication device of the user of the plurality of users;
   listening, at a broadcast receiver, an intent of a cloud to device messaging service, wherein the intent refers to C2DM intent that is an explicit broadcast from Android OS containing push notification data; and
   rendering, from the broadcast receiver, the push notification to the communication device of the user of the plurality of users, wherein the rendering of the notification message is not prohibited by any battery optimization in the communication device, and wherein the push notification is a relevant set of data provided to the user of the plurality of users, wherein a software development kit ("SDK") associated with the broadcast receiver prevents the mobile operating system from application not responding ("ANR") errors, and wherein the SDK runs for a time period that is not more than 5 seconds whenever the notification message reaches the communication device, and wherein the SDK disables the battery optimization.

2. The computer-implemented method as recited in claim 1, wherein the set of data comprises of a notification message and a data message.

3. The computer-implemented method as recited in claim 1, wherein the broadcast receiver instantly decodes the set of data and renders the notification in the communication device of the user of the plurality of users.

4. A computer system, comprising:
   one or more processors; and
   a memory coupled to the one or more processors, the memory for storing instructions which, when executed by the one or more processors, cause the one or more processors to perform a method for rendering push notifications in a communication device, the method comprising:
   receiving, at a firebase cloud messaging server, a set of data related to a push notification to be rendered in the communication device of a user of a plurality of users;
   delivering, to a mobile operating system, the set of data from the firebase cloud messaging server, wherein the mobile operating system is installed in the communication device of the user of the plurality of users;
   listening, at a broadcast receiver, an intent of a cloud to device messaging service, wherein the intent refers to C2DM intent that is an explicit broadcast from Android OS containing push notification data; and
   rendering, from the broadcast receiver, the push notification to the communication device of the user of the plurality of users, wherein the rendering of the notification message is not prohibited by any battery optimization in the communication device, and wherein the push notification is a relevant set of data provided to the user of the plurality of users, wherein a software development kit ("SDK") associated with the broadcast receiver prevents the mobile operating system from application not responding ("ANR") errors, and wherein the SDK runs for a time period that is 5 seconds or less and that is sufficiently brief to avoid any ANR errors whenever the notification message reaches the communication device, and wherein the SDK disables the battery optimization.

5. The computer system as recited in claim 4, wherein the set of data comprises of a notification message and a data message.

6. The computer system as recited in claim 4, wherein the broadcast receiver instantly decodes the set of data and renders the notification in the communication device of the user of the plurality of users.

7. A non-transitory computer-readable storage medium encoding computer executable instructions that, when executed by at least one processor, performs a method for rendering push notifications in a communication device, the method comprising:

receiving, at a firebase cloud messaging server, a set of data related to a push notification to be rendered in the communication device of a user of a plurality of users;

delivering, to a mobile operating system, the set of data from the firebase cloud messaging server, wherein the mobile operating system is installed in the communication device of the user of the plurality of users;

listening, at a broadcast receiver, an intent of a cloud to device messaging service, wherein the intent refers to C2DM intent that is an explicit broadcast from Android OS containing push notification data; and rendering, from the broadcast receiver, the push notification to the communication device of the user of the plurality of users, wherein the rendering of the notification message is not prohibited by any battery optimization in the communication device, and wherein the push notification is a relevant set of data provided to the user of the plurality of users, wherein a software development kit ("SDK") associated with the broadcast receiver prevents the mobile operating system from application not responding ("ANR") errors, and wherein the SDK runs for a time period that is sufficiently brief to avoid any ANR errors whenever the notification message reaches the communication device, and wherein the SDK disables the battery optimization.

8. The non-transitory computer-readable storage medium as recited in claim 7, wherein the set of data comprises of a notification message and a data message.

9. The non-transitory computer-readable storage medium as recited in claim 7, wherein the broadcast receiver instantly decodes the set of data and renders the notification in the communication device of the user of the plurality of users.

* * * * *